(12) United States Patent
Ayik et al.

(10) Patent No.: US 11,301,493 B2
(45) Date of Patent: Apr. 12, 2022

(54) SYSTEMS AND METHODS FOR PROVIDING DATA EXPLORATION TECHNIQUES

(71) Applicant: GE Aviation Systems LLC, Grand Rapids, MI (US)

(72) Inventors: Hatice Mujde Ayik, Istanbul (TR); Peter Knight, Eastleigh (GB)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/487,453

(22) Filed: Apr. 14, 2017

(65) Prior Publication Data

US 2017/0300554 A1  Oct. 19, 2017

(51) Int. Cl.
*G06F 16/20* (2019.01)
*G06F 16/28* (2019.01)
*G06F 16/245* (2019.01)
*G06F 16/9032* (2019.01)

(52) U.S. Cl.
CPC .......... *G06F 16/285* (2019.01); *G06F 16/245* (2019.01); *G06F 16/90324* (2019.01)

(58) Field of Classification Search
CPC .......... G06F 17/30424; G06F 17/3097; G06F 17/30598; G06F 17/30312; G06F 17/30994; G06F 16/245; G06F 16/285; G06F 16/90324; G06F 16/254
USPC ....................................................... 707/737
See application file for complete search history.

(56) References Cited

U.S. PATENT DOCUMENTS

| 5,999,192 | A | 12/1999 | Selfridge et al. |
| 7,062,447 | B1* | 6/2006 | Valentine ............... G06Q 10/00 700/28 |
| 7,523,106 | B2 | 4/2009 | Russell et al. |
| 7,587,685 | B2 | 9/2009 | Wallace |
| 8,898,200 | B2 | 11/2014 | Shridhar et al. |
| 9,817,563 | B1* | 11/2017 | Stokes .................. G06T 11/206 |
| 10,102,259 | B2* | 10/2018 | Agrawal ........... G06F 17/30551 |
| 10,318,545 | B1* | 6/2019 | Klippsten ........... G06F 3/04842 |

(Continued)

FOREIGN PATENT DOCUMENTS

| AU | 2008249210 A1 | 7/2009 |
| AU | 2014200203 A1 | 3/2014 |

OTHER PUBLICATIONS

French Search Report Corresponding to Application No. 1752982 dated Mar. 27, 2020.

(Continued)

*Primary Examiner* — Vincent F Boccio
(74) *Attorney, Agent, or Firm* — Dority & Manning, P.A.

(57) ABSTRACT

Systems and methods for providing data exploration techniques are provided. For instance, user inputs specifying one or more data parameters can be received. One or more data sets can be obtained from a data source based at least in part on the data parameters. The data can be grouped into one or more groupings based at least in part on the data parameters. Each data grouping can have a plurality of subsets. A distribution of data can be determined for each data subset. A plurality of data representations can be generated based at least in part on the data parameters and the distributions of data. The distributions of data for each data subset can then be compared. One or more suggested applications or at least one data subset can be determined based at least in part on the comparison.

20 Claims, 5 Drawing Sheets

(56) References Cited

U.S. PATENT DOCUMENTS

| | | | | |
|---|---|---|---|---|
| 2007/0033185 A1* | 2/2007 | Maag | ............... | G06F 17/30286 |
| 2007/0203720 A1* | 8/2007 | Singh | ................... | G06Q 10/063 |
| | | | | 705/7.11 |
| 2008/0288889 A1* | 11/2008 | Hunt | ..................... | G06Q 30/02 |
| | | | | 715/810 |
| 2012/0072283 A1* | 3/2012 | DeVore | ............. | G06Q 30/0251 |
| | | | | 705/14.49 |
| 2012/0117558 A1* | 5/2012 | Futty | ........................ | G06F 8/61 |
| | | | | 717/176 |
| 2012/0254289 A1* | 10/2012 | Sathish | ............. | G06Q 30/0631 |
| | | | | 709/203 |
| 2014/0101092 A1* | 4/2014 | Simitsis | ................. | G06F 9/451 |
| | | | | 707/602 |
| 2014/0222744 A1* | 8/2014 | Maag | ..................... | G06F 16/20 |
| | | | | 706/46 |
| 2014/0229497 A1 | 8/2014 | Wolfram et al. | | |
| 2014/0351233 A1* | 11/2014 | Crupi | ............... | G06F 16/24568 |
| | | | | 707/706 |
| 2015/0278277 A1* | 10/2015 | Agrawal | .......... | G06F 17/30551 |
| | | | | 707/746 |
| 2016/0026662 A1* | 1/2016 | Luo | ................... | G06F 17/30864 |
| | | | | 707/748 |
| 2016/0103872 A1* | 4/2016 | Prophete | ............ | G06F 16/2428 |
| | | | | 707/722 |

OTHER PUBLICATIONS

Roemer et al., "Advanced diagnostics and prognostics for gas turbine engine risk assessment", Aerospace Conference Proceedings, vol. 6,, Piscataway, NJ, Mar. 2000, pp. 345-353.

Qingfeng Lou, "Aircraft APU Starter Health Monitoring and Failure Prognostics" Carlton University, Dec. 2013.

* cited by examiner

SYSTEMS AND METHODS FOR PROVIDING DATA EXPLORATION TECHNIQUES

FIELD OF THE INVENTION

The present subject matter relates generally data exploration, and more particularly to analyzing data based at least in part on user specified parameters.

BACKGROUND OF THE INVENTION

Data exploration is an important tool in evaluating data, and is typically performed prior to further, more in-depth analysis of the data, such as modeling and/or processing. Data exploration can provide insights into the behavioral dynamics of data, which can be used to guide the further analysis. For instance, data exploration can include statistical analysis and/or visual analysis associated with the data.

Conventional data exploration can be performed using various tools or platforms, such as database management systems, statistical analysis packages, visualization tools, etc. However, such tools may not provide a complete or comprehensive view of the data. In this manner, analysis results from multiple platforms may need to be combined to realize such comprehensive view of the data.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a computer-implemented method of performing data analysis. The method includes receiving, by the one or more computing devices, one or more user inputs specifying one or more data parameters. The method further includes obtaining, by one or more computing devices, one or more data sets from a data source based at least in part on the one or more data parameters. The method further includes grouping, by the one or more computing devices, data from the one or more data sets into one or more data groupings based at least in part on the one or more data parameters. Each data grouping has a plurality of data subsets. The method further includes determining, by the one or more computing devices, a distribution of data for each data subset of the plurality of data subsets. The method further includes generating, by the one or more computing devices, a plurality of data representations based at least in part on the one or more data parameters and the distribution of data for each data subset. The plurality of data representations comprising visual data representations. The method further includes comparing, by the one or more computing devices, the distributions of data for each data subset of the plurality of data subsets. The method further includes determining, by the one or more computing devices, one or more suggested applications for at least one data subset based at least in part on the comparison.

Another example aspect of the present disclosure is directed to a computing system comprising one or more processors and one or more memory devices. The one or more memory devices store computer-readable instructions that when executed by the one or more processors cause the one or more processors to perform operations. The operations include receiving one or more user inputs specifying one or more data parameters. The operations further include obtaining one or more data sets from a data source based at least in part on the one or more data parameters. The operations further include grouping data from the one or more data sets into one or more data groupings based at least in part on the one or more data parameters. Each data grouping has a plurality of data subsets. The operations further include determining a distribution of data for each data subset of the plurality of data subsets. The operations further include generating a plurality of data representations based at least in part on the one or more data parameters and the distribution of data for each data subset. The plurality of data representations comprise visual data representations. The operations further include comparing the distributions of data for each data subset of the plurality of data subsets. The operations further include determining one or more suggested applications for at least one data subset based at least in part on the comparison.

Yet another example aspect of the present disclosure is directed to one or more tangible, non-transitory computer-readable media storing computer-readable instructions that when executed by one or more processors cause the one or more processors to perform operations. The operations include receiving one or more user inputs specifying one or more data parameters. The operations further include obtaining one or more data sets from a data source based at least in part on the one or more data parameters. The operations further include grouping data from the one or more data sets into one or more data groupings based at least in part on the one or more data parameters. Each data grouping has a plurality of data subsets. The operations further include determining a distribution of data for each data subset of the plurality of data subsets. The operations further include generating a plurality of data representations based at least in part on the one or more data parameters and the distribution of data for each data subset. The plurality of data representations comprise visual data representations. The operations further include comparing the distributions of data for each data subset of the plurality of data subsets. The operations further include determining one or more suggested applications for at least one data subset based at least in part on the comparison.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to performing data exploration and/or data analysis on one or more data sets. For instance, one or more data parameters specified by a user can be used to obtain and group one or more sets of data into a plurality of data subsets. For instance, the user specified data parameters may specify the data to be obtained and/or one or more parameters by which to group the data. A data distribution can be determined for each data subset and/or for the overall data set(s), and one or more visual data representations associated with the data distributions can be generated. A comparison analysis can be performed between the data distributions, and one or more suggested applications to be associated with data subsets can be determined based at least in part on the analysis.

In some implementations, the obtained data can be associated with one or more aircraft engines. For instance, the obtained data can be associated with one or more engine configurations. It will be appreciated that various other suitable data can be used without deviating from the scope of the present disclosure. The user specified data parameters can be input by a user, for instance, through one or more interactions with a user interface. As indicated, the data parameters can specify the data to be obtained. For instance, the data parameters can specify a data location (e.g. file, database, etc.), a data range, and/or other suitable data identifier. The data parameters can further include one or more groupings by which the data is to be structured. The groupings can include one or more categories associated with the data. In some implementations, the data can be grouped according to parameters associated with the data. For instance, in implementations wherein the data is associated with one or more aircraft engines, the data can be grouped by fleet, engine make, model, component, configuration, etc. As another example, if the data is associated with groups of people, the data can be grouped by age, gender, profession, education level, etc. Each grouping can include one or more subsets within the grouping. For instance, in implementations wherein the data is associated with people, and is grouped in accordance with the ages of the people, the one or more subsets can include various age groups (e.g. children, teenagers, adults, elderly, etc.). In this manner, the data can be grouped into one or more data groupings, each grouping having one or more subsets.

The data parameters can further specify one or more operations to be performed on the data. The one or more operations can include calculations or computations to be performed on or otherwise associated with the data. For instance, the operations can include determining a number of null data points associated with each subset, outlier data points associated with each subset, determining a distribution of data for each subset, and/or various other suitable operations. In this manner, the operations can be performed in accordance with the data parameters. The data parameters can further specify one or more data representations to be generated. The data representations can be generated based at least in part on the one or more operations, and can be associated with one or more data subsets, and/or for the entirety of the data. The data representations can include visual data representations, tabular data representations, and/or various other suitable data representations. In some implementations, the visual data representations can include plots specifying null data points, outlier data points, number of assets, etc. The visual data representations can further include heat map matrices, scatter matrices, box and whisker plots, distribution plots, and/or various other suitable visual data representations.

The tabular data representations can include data represented in a tabular format, such as in one or more table structures. The tabular data representations can be generated based at least in part on the data and/or the operations associated with the data. The tabular data representations can be associated with one or more data subsets, and/or for the entirety of the data. The tabular data representations can specify data associated with null data points, outlier data points, etc. and can further specify descriptive statistics, such as for instance, mean, standard deviation, median, inter quartile range, maximum, minimum, range, etc.

Once the data operations, and/or the data representations have been determined and/or generated, an analysis of the data can be performed. For instance, a comparison analysis can be performed between the distributions of data for each subset and/or for the overall distribution of data. In some implementations, the comparison analysis can include determining a comparison score indicative of a measure of distance between two or more data distributions. For instance, the distribution score can be determined using a Kullback-Leibler divergence technique. In some implementations, each data distribution can be compared to every other data distribution. In alternative implementations, the comparison analysis can be performed on various other suitable distribution combinations.

One or more applications to be associated with the data can then be determined based at least in part on the comparison scores. For instance, the one or more suggested applications can be associated with further processing of the data. In some implementations, the suggested applications can be associated with one or more statistical models to be generated from the data. For instance, the suggested applications can include a type of statistical model to be associated with one or more subsets, and/or one or more subset combinations to include in each of the one or more model types. In particular, it can be determined that data subsets with similar distributions, as indicated by the comparison score(s), should be modeled together. As another example, it can be determined that data subsets with dissimilar distributions, as indicated by the comparison score(s), should not be modeled together. In this manner, the suggested applications can include one or more proposed models, and/or the data to be associated with the proposed models.

In some implementations, the suggested applications can be determined by comparing the comparison scores associated with the data subsets to a comparison threshold. In particular, if the comparison score between two data subsets indicates a degree of difference between the subsets that is greater than the comparison threshold, it can be determined that the two subsets should not be modeled together. Similarly, if the comparison score indicates a degree of difference less than the comparison threshold, it may be determined that the subsets are suitable to include in the same model. In this manner, the more similar two subsets are to one another, the more likely it may be that the two subsets are suitable for inclusion in the same model.

In some implementations, the data representations and/or the suggested application(s) can be provided for display to the user in one or more user interfaces. For instance, the data representations and/or suggested applications can be stored in one or more locations on a computing device associated with the user, such that the user may obtain relevant information associated with the data in a convenient, centralized location. Providing such information to the user in this manner can help the user to gain valuable insights into the data that the user may not otherwise be able to easily obtain. In some implementations, the suggested application(s) and/or at least a portion of the data representations can be provided to the user in a "data exploration report" that includes a summary of key findings associated with the data. For instance, the report can include one or more visual data representations, tabular data representations, and/or one or more suggested applications. In some implementations, the data representations contained in the report can be related to the suggested applications contained in the report. For instance, if a suggested application specifies two or more data subsets that should be modeled together, the data representations can depict or otherwise be associated with the data distributions and/or comparison scores associated with the two or more data subsets.

Figure 1:
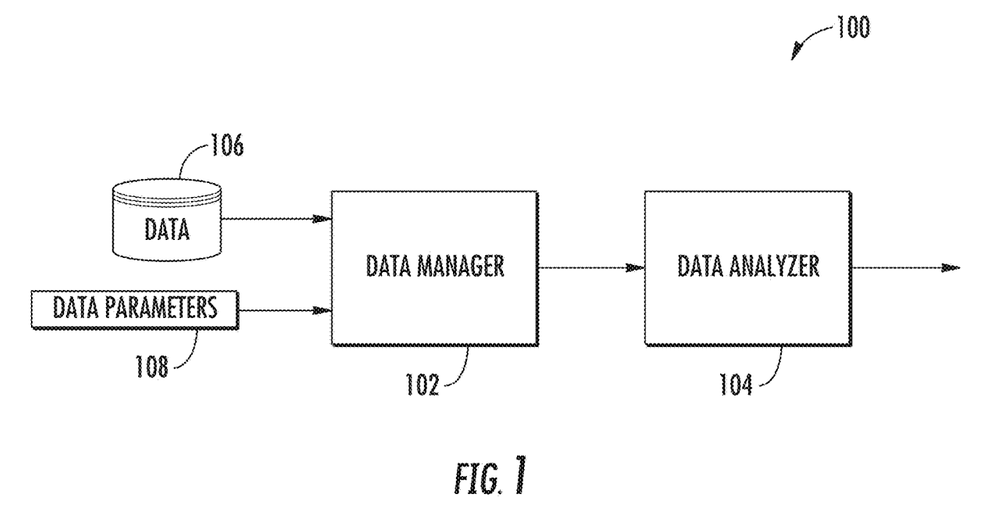
FIG. 1 depicts an example system of performing data analysis according to example embodiments of the present disclosure.

Referring now to the figures, example aspects of the present disclosure will be discussed in more detail. For instance, FIG. 1 depicts an example computing system 100 configured to perform data exploration techniques on one or more sets of data according to example embodiments of the present disclosure. System 100 includes a data manager 102 and a data analyzer 104. Data manager 102 can be configured to receive data 106 and data parameters 108.

In some implementations, data parameters 108 can include one or more user specified parameters associated with data to which data exploration techniques will be applied. For instance, data parameters 108 can specify data 106. In particular, parameters 108 can include one or more identifiers of data 108, such as for instance, one or more identifiers associated with a data file location, a database, a data range, etc. In this manner, the user can specify the data to be obtained.

As indicated above, data parameters 108 can further specify one or more operations to be performed on or otherwise associated with data 108, one or more data representations (e.g. visual data representations, tabular data representations, etc.) to be generated, properties associated with the data representations (e.g. number of bins, formatting properties), one or more data groupings or parameters by which the data should be grouped, one or more data subsets to be associated with the data groupings, and/or other parameters.

Data manager 102 can be configured to perform one or more tasks based at least in part on data 106 and data parameters 108. For instance, data manager 102 can be configured to perform one or more operations on data 106 as specified by data parameters 108. The operations can include computations or calculations associated with data 106. In particular, the operations can be performed on one or more data variables, subsets, and/or groups. For instance, the operations can include determining a number of null data values, a number of outlier data points, data distributions, a number of assets, mean values, median values, standard deviations, inter quartile ranges, maximums, minimums, ranges, etc. for one or more variables, subsets, and/or groupings of data. In some implementations, the operations can include removing the null data points and/or outlier data points before performing the computations. For instance, once the null data points and outlier data points are identified, they can be removed from the data set before the data distributions are calculated. The tabular data representations can include one or more table structures populated with the appropriate data. The visual data representations can include one or more plots, such as one or more plots specifying a number of null data values, outlier data values, scatter matrix plots, heat matrix plots, box and whisker plots, distribution plots, etc.

Figure 2:
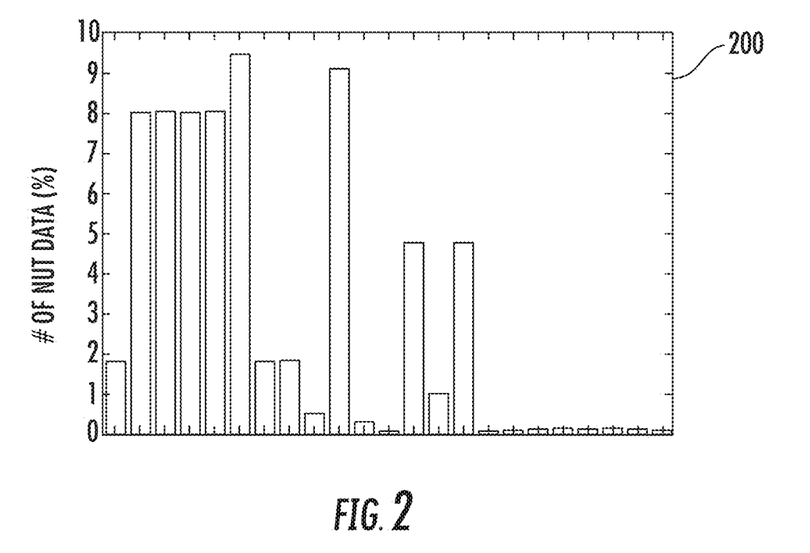
FIGS. 2, 3, 4, 5, 6, and 7 depict example data representations according to example embodiments of the present disclosure.
Figure 3:
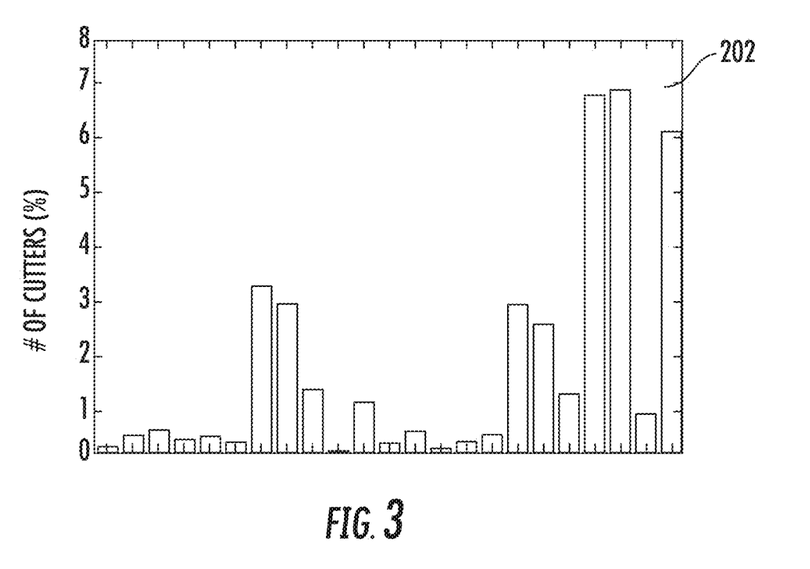
Figure 4:
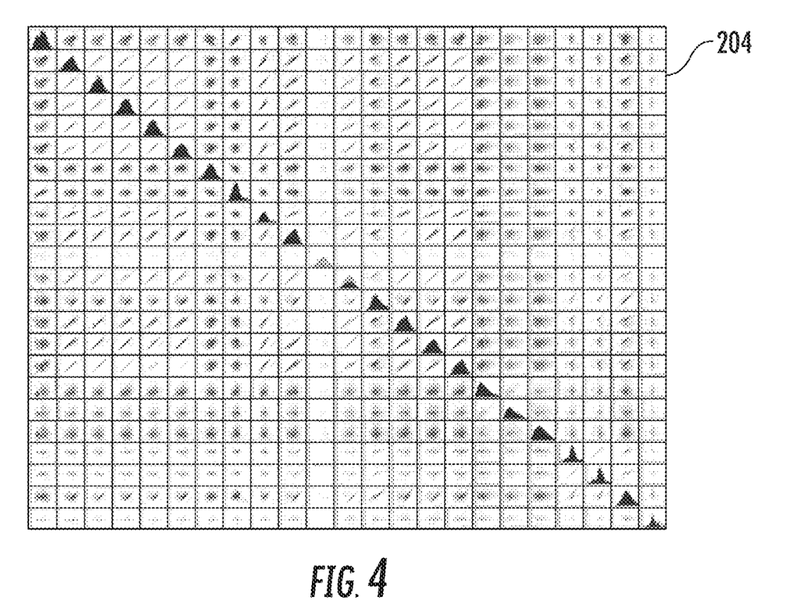

For instance, FIGS. 2-7 depict example visual data representations generated according to example embodiments of the present disclosure. FIG. 2 depicts an example bar chart 200 specifying a percentage of null or empty data values for a number of categorical variables associated, for instance, with data 106 of FIG. 1. FIG. 3 depicts an example bar chart 202 specifying a percentage of outlier data values for a number of categorical variables associated, for instance, with data 106. It will be appreciated by those skilled in the art that the outlier data values can be defined in various suitable manners without deviating from the scope of the present disclosure. FIG. 4 depicts a heat map matrix plot 204 specifying a density distribution between a number of categorical variables associated, for instance, with data 106. Plot 204 can be used to identify categories that are correlated, whose distribution is not normal, etc. In some implementations, plot 204 may include any subset of categories.

Figure 5:
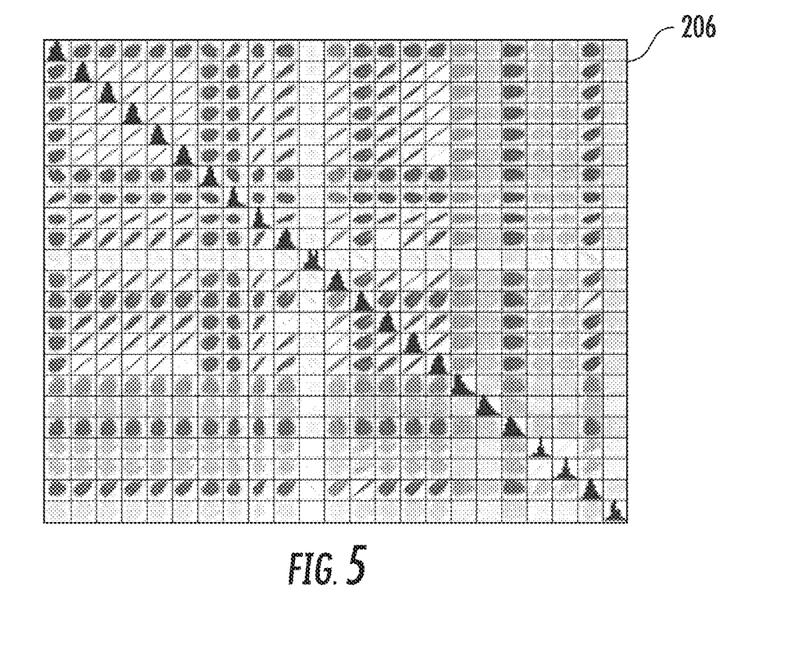
Figure 6:
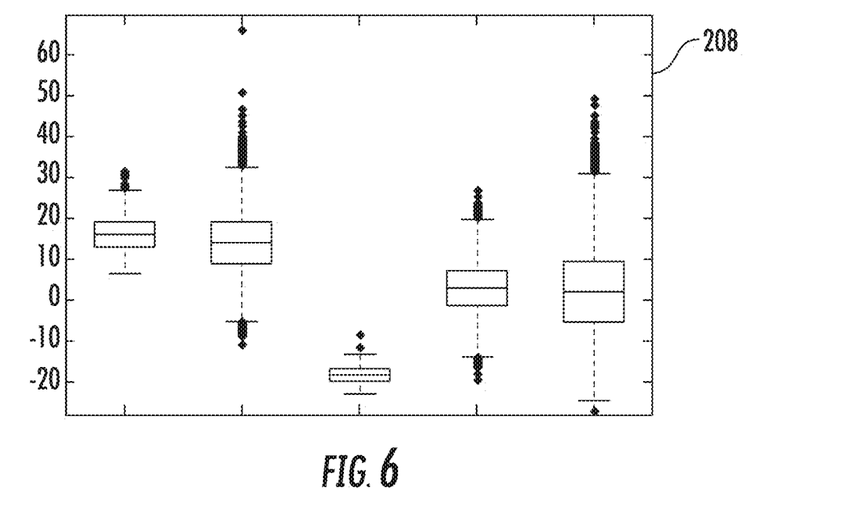

FIG. 5 depicts an example scatter matrix plot 206 according to example embodiments of the present disclosure. Plot 206 can be produced for each subset of data 106, or for any suitable combination of subsets. FIG. 6 depicts an example box and whisker plot 208 according to example embodiments of the present disclosure. In some implementations, box and whisker plots can be generated for each category, by subset of data 106. As will be understood by those skilled in the art, plot 208 depicts median values, $25^{th}$ and $25^{th}$ percentiles, the most extreme data points not considered outliers, and/or outliers (plotted individually).

Figure 7:
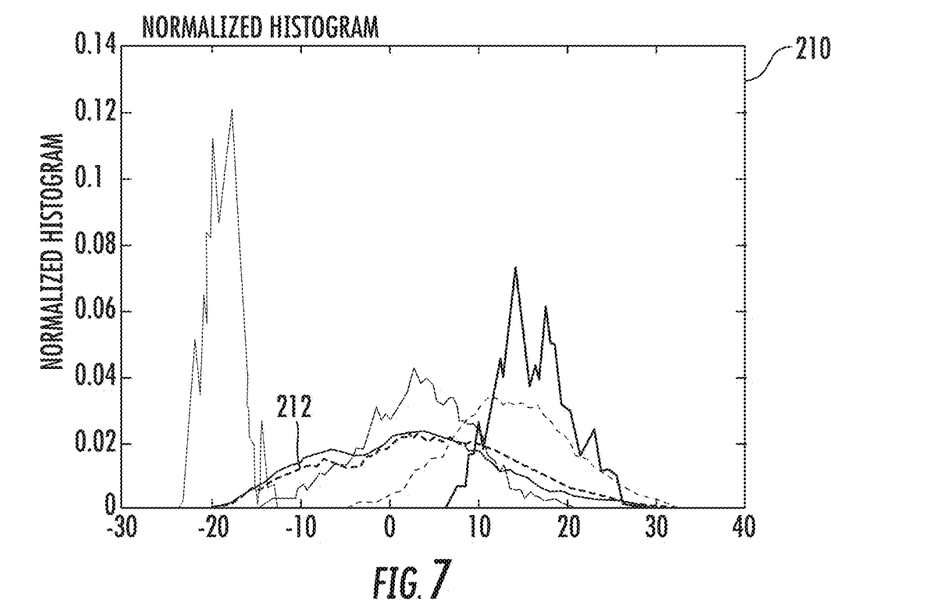

FIG. 7 depicts an example data distribution plot 210 according to example embodiments of the present disclosure. In particular, plot 210 depicts data distributions associated with a number of subsets associated with data 106. Plot 210 further depicts the overall distribution 212 of data 106. Plot 210 can provide a visual comparison of the measure of similarity between the subset distributions.

It will be appreciated that various other suitable data representations can be generated that correspond to plots 200-210. For instance, one or more tabular data representations can be generated depicting the data in the form of a table structure. It will further be appreciated that, in some implementations, plots 206-210 can be generated to include outlier and/or null data points, or to not include such data points.

Referring back to FIG. 1, data analyzer 104 can be configured to receive the generated data representations, the results of the data operations, and/or data 106. In some implementations, data analyzer 104 can be configured to compare the data distributions of each data subset. For instance, as indicated above, comparing the data distributions can include determining a comparison score for two or more data subsets. The comparison score can be a measure of difference between data distributions of the two or more subsets.

The comparison scores and/or the distribution data can be used to determine one or more applications to be associated with data 104. For instance, the one or more applications can include generating one or more statistical models based at least in part on data 104. In this manner, data analyzer 104 can be configured to determine one or more types of models to be generated and one or more data subsets to use in generating the model(s). For instance, in some implementations, if the data is not normally distributed, data manager 104 can determine that a parametric statistical model should not be used.

As indicated above, data manager 102 and/or data analyzer 104 can be configured to organize and/or store the data representations and/or data indicative of the one or more applications in one or more locations within system 100, such that a user may be able to visually inspect data 106 and/or the calculations performed on data 106. In some implementations, data analyzer 104 can be configured to generate and provide for display a "data exploration report" that includes a summary of key findings associated with data 106 and/or one or more suggested applications.

In some implementations, the suggested applications can be determined using one or more computer intelligence techniques, such as one or more machine learning techniques. For instance, in such implementations, data analyzer 104 can include a machine learning model configured to receive data as input and to provide one or more suggested applications as output. For instance, the machine learning model can be any suitable model, such as a neural network, convolutional neural network, Naive Bayes model, nearest neighbor model, support vector machine, and/or various other suitable model. The machine learning model can be configured to predict one or more applications that the input data may be well suited for. In some implementations, the machine learning model may be configured to receive two or more data distributions respectively associated with two or more data subsets, and to determine whether to model the subsets together. The machine learning model may be trained using supervised (e.g. using a training data set) and/or unsupervised training techniques. In this manner, data analyzer 104 can be configured to make intelligent determinations or predictions associated with the data.

Figure 8:
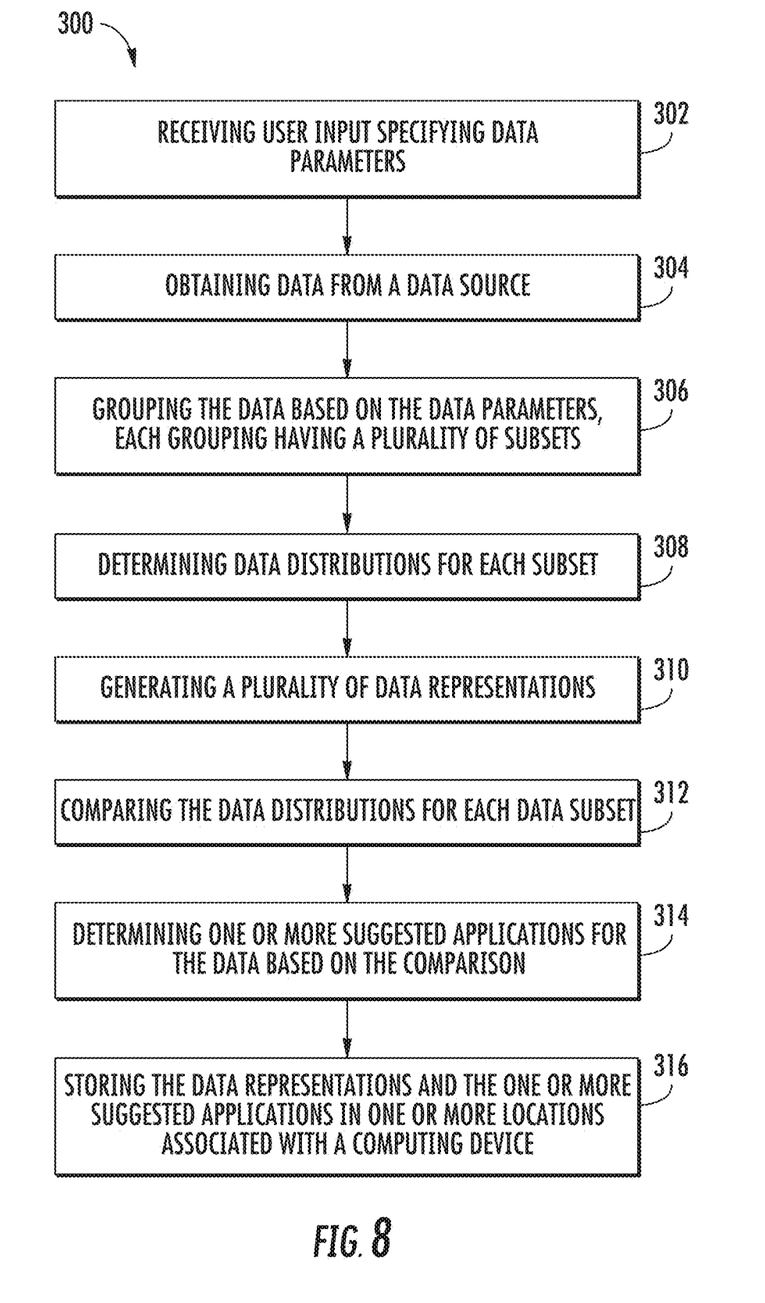
FIG. 8 depicts a flow diagram of an example method of performing data analysis according to example embodiments of the present disclosure.

FIG. 8 depicts a flow diagram of an example method 300 of performing data exploration techniques on one or more sets of data according to example embodiments of the present disclosure. Method (300) can be implemented by one or more computing devices, such as one or more of the computing devices depicted in FIG. 1. In addition, FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving one or more user inputs indicative of one or more data parameters. The user inputs can be associated with a user interaction with a computing device, such as system 100 of FIG. 1. In particular, the user interactions can be associated with a user interface provided for display by the computing device. As indicated above, the data parameters can include data identifiers, operations to be performed on the data, data representations to be generated, properties and/or characteristics of the data operations and representations, and/or various other suitable parameters.

At (304), method (300) can include obtaining data from a data source based at least in part on the user specified parameters. For instance, one or more sets of data can be identified based at least in part on the identifiers (e.g. location, data range, etc.) specified in the data parameters, and obtained from the data source associated with the identifiers.

At (306), method (300) can include grouping the data based at least in part on the data parameters. In some implementations, the data can be grouped according to some criteria specified in the data parameters. The data can be further grouped into a plurality of subsets associated with the grouping criteria. As an example, a user may specify that data associated with cholesterol levels of a collection of people be grouped by the age of the people. The data may be further grouped into a plurality of subsets associated with one or more age ranges.

At (308), method (300) can include determining distributions of data for one or more data subsets. For instance, the distributions can be determined in accordance with the user specified data parameters. In some implementations, a data distribution can be determined for the entirety of the obtained data as well as the one or more data subsets.

At (310), method (300) can include generating a plurality of data representations associated with the obtained data. For instance, the data representations can be associated with the operations performed on the data, as specified in the data parameters. In particular, the data representations can depict the results of the performed operations. The data representations can be visual data representations, tabular data representations, or other suitable data representations.

At (312), method (300) can include comparing the data distributions between each subset of data. As indicated, comparing the data distributions can include determining a comparison score between two or more subsets, providing a measure of similarity between the distributions of the two or more subsets. In some implementations, comparison scores may be determined for each subset between every other subset and/or the overall data distribution. In this manner, each subset can receive a comparison score corresponding to a measure of similarity between that subset and every other subset.

At (314), method (300) can include determining one or more suggested applications for the data and/or for one or more subsets of data based at least in part on the comparison. For instance, the suggested applications may be determined by analyzing the data and/or the corresponding comparison scores to determine the one or more suggested applications. In some implementations, the analysis can provide an indication of the data subset having the most different distribution from the overall distribution and/or from the other subsets. In some implementations, the suggested applications can be associated with one or more statistical modeling techniques associated with the data. For instance, the suggested applications may provide one or more suggested model types to generate based on the data analysis. As another example, the suggested applications may include one or more suggested data subsets with which to model.

At (316), method (300) can include storing the data representations and/or the one or more suggested applications in one or more locations within a computing device. For instance, the one or more locations can be structured in an organized manner such that a user can conveniently access the data representations and/or the suggested applications in a centralized location. In this manner, the user may be able to gain valuable insights into the nature of the data through analysis of the stored information. In some implementations, the one or more locations may be organized by subset, by type of file, by the information stored, and/or by other suitable organization technique. In some implementations, a data exploration report may be generated and stored, providing a summary of one or more valuable insights into the data and/or one or more suggested applications. In this manner, the suggested applications can be provided to the user as recommended actions to take associated with further analysis of the obtained data.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of performing data analysis, the method comprising:
   receiving, by one or more computing devices, one or more user inputs indicative of one or more user-specified data parameters;
   obtaining, by the one or more computing devices, one or more data sets from a data source containing data not yet defined as data sets based at least in part on the one or more user-specified data parameters;
   grouping, by the one or more computing devices, data from the one or more data sets into one or more data groupings based at least in part on the one or more user-specified data parameters, each data grouping having a plurality of data subsets;
   determining, by the one or more computing devices, a distribution of data for each data subset of the plurality of data subsets based, at least in part, on the one or more user-specified data parameters;
   generating, by the one or more computing devices, a plurality of data representations based at least in part on the one or more user-specified data parameters and the distribution of data for each data subset, the plurality of data representations comprising visual data representations;
   comparing, by the one or more computing devices, the distributions of data for each data subset of the plurality of data subsets; and
   determining, by the one or more computing devices, using a machine learning model, one or more suggested applications to be associated with at least one data subset of the plurality of data subsets based at least in part on the comparison, wherein the one or more suggested applications comprise one or more models to be generated from the at least one data subset of the plurality of data subsets.

2. The computer-implemented method of claim 1, wherein comparing, by the one or more computing devices, the distributions of data for each data subset of the plurality of data subsets comprises determining one or more comparison scores for each data subset, each comparison score providing a measure of difference between the distribution of data of a data subset and the distribution of data for at least one other data subset.

3. The computer-implemented method of claim 2, further comprising comparing, by the one or more computing devices, each determined comparison score to a comparison threshold.

4. The computer-implemented method of claim 3, wherein determining, by the one or more computing devices, using a machine learning model, one or more suggested applications to be associated with at least one data subset of the plurality of data subsets comprises determining, using a machine learning model, one or more suggested applications to be performed on at least one data subset of the plurality of data subsets based at least in part on the comparison of each determined comparison score to the comparison threshold.

5. The computer-implemented method of claim 1, further comprising providing for display, by the one or more computing devices, the plurality of data representations in a user interface.

6. The computer-implemented method of claim 1, wherein the plurality of data representations comprise at least one visual data representation and at least one tabular data representation.

7. The computer-implemented method of claim 6, wherein the at least one visual data representation comprises at least one heat matrix plot, scatter matrix plot, or box and whisker plot.

8. The computer-implemented method of claim 1, wherein the at least one data representation comprises at least one data representation associated with a distribution, data representation associated with outlier data values, or data representation associated with null data values.

9. The computer-implemented method of claim 1, wherein the data parameters comprise one or more operations to be performed on the one or more data sets.

10. The computer-implemented method of claim 9, further comprising performing, by the one or more computing devices, the one or more operations on the one or more data sets in accordance with the one or more data parameters.

11. The computer-implemented method of claim 9, wherein the one or more data representations are determined based at least in part on the one or more operations.

12. The computer-implemented method of claim 1, wherein the one or more data sets are associated with one or more aircraft engines.

13. The computer-implemented method of claim 1, wherein the one or more suggested applications are associated with data processing associated with the at least one data subset of the plurality of data subsets.

14. The computer-implemented method of claim 13, wherein the one or more suggested applications comprise one or more statistical models and one or more data subsets of the plurality of data subsets to be associated with the one or more statistical models.

15. The computer-implemented method of claim 1, wherein determining, by the one or more computing devices, using a machine learning model, one or more suggested applications comprises providing two or more distributions of data as input to a machine learning model and receiving one or more suggested applications as output of the machine learning model.

16. A computing system, comprising:
   one or more processors; and
   one or more memory devices, the one or more memory devices storing computer-readable instructions that when executed by the one or more processors cause the one or more processors to perform operations, the operations comprising:

receiving one or more user inputs indicative of one or more user-specified data parameters;

obtaining one or more data sets from a data source containing data not yet defined as data sets based at least in part on the one or more user-specified data parameters;

grouping data from the one or more data sets into one or more data groupings based at least in part on the one or more user-specified data parameters, each data grouping having a plurality of data subsets;

determining a distribution of data for each data subset of the plurality of data subsets based, at least in part, on the one or more user-specified data parameters;

generating a plurality of data representations based at least in part on the one or more user-specified data parameters and the distribution of data for each data subset, the plurality of data representations comprising visual data representations;

comparing the distributions of data for each data subset of the plurality of data subsets; and determining, using a machine learning model, one or more suggested applications to be associated with at least one data subset of the plurality of data subsets based at least in part on the comparison, wherein the one or more suggested applications comprise one or more models to be generated from the at least one data subset of the plurality of data subsets.

17. The computing system of claim 16, wherein comparing the distributions of data for each data subset of the plurality of data subsets comprises determining one or more comparison scores for each data subset, each comparison score providing a measure of difference between the distribution of data of a data subset and the distribution of data for at least one other data subset.

18. The computing system of claim 17, the operations further comprising comparing each determined comparison score to a comparison threshold.

19. The computing system of claim 18, wherein determining, using a machine learning model, one or more suggested applications to be associated with at least one data subset of the plurality of data subsets comprises determining, using a machine learning model, one or more suggested applications to be performed on at least one data subset of the plurality of data subsets based at least in part on the comparison of each determined comparison score to the comparison threshold.

20. One or more tangible, non-transitory computer-readable media storing computer-readable instructions that when executed by one or more processors cause the one or more processors to perform operations, the operations comprising:

receiving one or more user inputs indicative of one or more user-specified data parameters;

obtaining one or more data sets from a data source containing data not yet defined as data sets based at least in part on the one or more user-specified data parameters;

grouping data from the one or more data sets into one or more data groupings based at least in part on the one or more user-specified data parameters, each data grouping having a plurality of data subsets;

determining a distribution of data for each data subset of the plurality of data subsets based, at least in part, on the one or more user-specified data parameters;

generating a plurality of data representations based at least in part on the one or more user-specified data parameters and the distribution of data for each data subset, the plurality of data representations comprising visual data representations;

comparing the distributions of data for each data subset of the plurality of data subsets; and determining, using a machine learning model, one or more suggested applications to be associated with at least one data subset of the plurality of data subsets based at least in part on the comparison, wherein the one or more suggested applications comprise one or more models to be generated from the at least one data subset of the plurality of data subsets.

* * * * *